(12) United States Patent
Lowe et al.

(10) Patent No.: US 9,721,482 B2
(45) Date of Patent: Aug. 1, 2017

(54) PREGNANT ABDOMINAL SYSTEM AND ASSOCIATED DEVICES, SYSTEMS, AND METHODS

(71) Applicant: Gaumard Scientific Company, Inc., Miami, FL (US)

(72) Inventors: Siobhain Lowe, Miami, FL (US); Christine M. Tarud, Miami, FL (US)

(73) Assignee: GAUMARD SCIENTIFIC COMPANY, INC., Miami, FL (US)

( * ) Notice: Subject to any disclaimer, the term of this patent is extended or adjusted under 35 U.S.C. 154(b) by 382 days.

(21) Appl. No.: 14/164,429

(22) Filed: Jan. 27, 2014

(65) Prior Publication Data

US 2014/0212863 A1    Jul. 31, 2014

Related U.S. Application Data

(60) Provisional application No. 61/757,143, filed on Jan. 26, 2013.

(51) Int. Cl.
| | |
|---|---|
| *G09B 23/34* | (2006.01) |
| *G09B 23/28* | (2006.01) |
| *B29C 41/04* | (2006.01) |
| *B29C 45/14* | (2006.01) |
| *B29L 31/00* | (2006.01) |
| *B29L 31/52* | (2006.01) |

(52) U.S. Cl.
CPC ............ *G09B 23/281* (2013.01); *B29C 41/04* (2013.01); *B29C 45/14* (2013.01); *B29C 45/14819* (2013.01); *B29L 2031/5218* (2013.01); *B29L 2031/7532* (2013.01); *Y10T 29/49826* (2015.01)

(58) Field of Classification Search
CPC ........ G09B 23/30; G09B 23/32; G09B 23/34; G09B 23/281; G09B 23/285

USPC ........................................................ 434/267
See application file for complete search history.

(56) References Cited

U.S. PATENT DOCUMENTS

| 2,551,433 | A | * | 5/1951 | Graves | G09B 23/281 |
| | | | | | 434/273 |
| 3,826,019 | A | * | 7/1974 | Knapp | G09B 23/281 |
| | | | | | 434/273 |
| 5,104,328 | A | * | 4/1992 | Lounsbury | G09B 23/34 |
| | | | | | 434/267 |

(Continued)

FOREIGN PATENT DOCUMENTS

CN        201590187 U  *  9/2010

OTHER PUBLICATIONS

"The Role of Amniotic Fluid," Penn Medicine, https://web.archive.org/web/20100106164214/http://www.pennmedicine.org/encyclopedia/em_DisplayAnimation.aspx?gcid=000130&ptid=17, Jan. 6, 2010.*

*Primary Examiner* — Nikolai A Gishnock
*Assistant Examiner* — Jennifer L Korb
(74) *Attorney, Agent, or Firm* — Haynes and Boone, LLP

(57) ABSTRACT

Simulated pregnant abdominal systems and associated devices, systems, and methods are provided. The pregnant abdominal systems allow an interactive scenario simulating a routine gestation palpation of a fetal baby, the performance of an external cephalic version as well as the Leopold's Maneuvers. Further, the pregnant abdominal systems can be used as a platform to physically hear the fetus heartbeat using stethoscope, Doppler instrument, or a prenatal monitor. Further, in some implementations the fetus can be visualized using standard ultrasound systems.

23 Claims, 19 Drawing Sheets

(56) References Cited

U.S. PATENT DOCUMENTS

| | | | |
|---|---|---|---|
| 5,472,345 A | 12/1995 | Eggert | |
| 5,538,005 A * | 7/1996 | Harrison | A61B 5/0011 |
| | | | 600/511 |
| 5,853,292 A | 12/1998 | Eggert et al. | |
| 6,193,519 B1 | 2/2001 | Eggert et al. | |
| 6,443,735 B1 | 9/2002 | Eggert et al. | |
| 6,503,087 B1 | 1/2003 | Eggert et al. | |
| 6,527,558 B1 | 3/2003 | Eggert et al. | |
| 6,758,676 B2 | 7/2004 | Eggert et al. | |
| 7,114,954 B2 | 10/2006 | Eggert et al. | |
| 7,192,284 B2 | 3/2007 | Eggert et al. | |
| 7,811,090 B2 | 10/2010 | Eggert et al. | |
| 7,866,983 B2 | 1/2011 | Hemphill et al. | |
| 7,976,312 B2 | 7/2011 | Eggert et al. | |
| 7,976,313 B2 | 7/2011 | Eggert et al. | |
| 8,016,598 B2 | 9/2011 | Eggert et al. | |
| 8,152,532 B2 | 4/2012 | Eggert et al. | |
| 8,419,438 B2 | 4/2013 | Eggert et al. | |
| 8,500,452 B2 | 8/2013 | Trotta et al. | |
| 8,517,740 B2 | 8/2013 | Trotta et al. | |
| 8,608,483 B2 | 12/2013 | Trotta et al. | |
| 8,678,831 B2 | 3/2014 | Trotta et al. | |
| 8,696,362 B2 | 4/2014 | Eggert et al. | |
| 8,740,624 B2 | 6/2014 | Eggert et al. | |
| 9,123,261 B2 * | 9/2015 | Lowe | G09B 23/30 |
| 2009/0148822 A1 | 6/2009 | Eggert et al. | |
| 2013/0337425 A1 * | 12/2013 | Allen | G09B 23/281 |
| | | | 434/268 |

\* cited by examiner

PREGNANT ABDOMINAL SYSTEM AND ASSOCIATED DEVICES, SYSTEMS, AND METHODS

CROSS-REFERENCE TO RELATED APPLICATIONS

The present application claims priority to and the benefit of U.S. Provisional Patent Application No. 61/757,143, filed Jan. 26, 2013, which is hereby incorporated by reference in its entirety.

BACKGROUND

As medical science has progressed, it has become increasingly important to provide non-human interactive formats for teaching patient care. While it is desirable to train medical personnel in patient care protocols before allowing contact with real patients, textbooks and flash cards lack the important benefits to students that can be attained from hands-on practice. On the other hand, allowing inexperienced students to perform medical procedures on actual patients that would allow for the hands-on practice cannot be considered a viable alternative because of the inherent risk to the patient. Non-human interactive devices and systems can be used to teach the skills needed to successfully identify and treat various patient conditions without putting actual patients at risk.

For example, patient care education has often been taught using medical instruments to perform patient care activity on a simulator, such as a manikin. Such training devices and systems can be used by medical personnel and medical students to teach and assess competencies such as patient care, medical knowledge, practice based learning and improvement, systems based practice, professionalism, and communication. The training devices and systems can also be used by patients to learn the proper way to perform self-examinations.

While these simulators have been adequate in many respects, they have not been adequate in all respects. Therefore, what is needed is an interactive education system for use in conducting patient care training sessions that is even more realistic and/or includes additional simulated features.

SUMMARY

Simulated pregnant abdominal systems and associated devices, systems, and methods are provided.

A pregnant abdominal system is provided that includes a platform; one or more support structures coupled to the platform; an amniotic sac containing a fetus, the amniotic sac positioned on the one or more support structures; and a skin layer coupled to the platform such that the one or more support structures and the amniotic sac are positioned within a space between the skin layer and the platform. The platform is sized and shaped for mating engagement with a torso of a patient simulator, such as a birthing simulator, in some instances. The one or more support structures can be formed of foam. In some implementations, the skin layer is configured to facilitate palpation of the fetus and the fetus is sized and shaped to simulate a third-term fetus. The amniotic sac can be filled with a medium having a similar viscosity to natural amniotic sac fluid. In some instances, the fetus is visible through the skin layer and within the amniotic sac using ultrasound. In that regard, the fetus can include embedded skeletal structures identifiable via ultrasound. The fetus can be palpable by a user through the skin layer and within the amniotic sac.

A patient simulator is provided that includes a torso sized and shaped to simulate a pregnant woman, the torso including a tummy cover that includes: a platform; one or more support structures coupled to the platform; an amniotic sac containing a fetus, the amniotic sac positioned on the one or more support structures; and a skin layer coupled to the platform such that the one or more support structures and the amniotic sac are positioned within a space between the skin layer and the platform. The patient simulator can further include arms, legs, and a head coupled to the torso. The patient simulator can also include a birthing mechanism positioned within the torso. In some implementations, the fetus is visible through the skin layer and within the amniotic sac using ultrasound and can include embedded skeletal structures identifiable via ultrasound.

A method of manufacturing a pregnant abdominal system is provided that includes positioning an amniotic sac containing a fetus on a platform; coupling one or more support structures to the platform adjacent to the amniotic sac; and coupling a skin layer to the platform such that the one or more support structures and the amniotic sac are positioned within a space between the skin layer and the platform. Coupling the one or more support structures to the platform includes gluing the one or more support structures to the platform in some instances. Similarly, coupling the skin layer to the platform includes gluing the skin layer to the platform in some instances. The method can also include forming the fetus using a rotational mold. The method can also include forming the fetus using an injection mold, wherein the fetus includes embedded skeletal structures identifiable via ultrasound.

Additional aspects and features of the present disclosure will be apparent from the following detailed description.

BRIEF DESCRIPTION OF THE DRAWINGS

The present disclosure can be better understood from the following detailed description when read with the accompanying figures.

DETAILED DESCRIPTION

Figure 1:
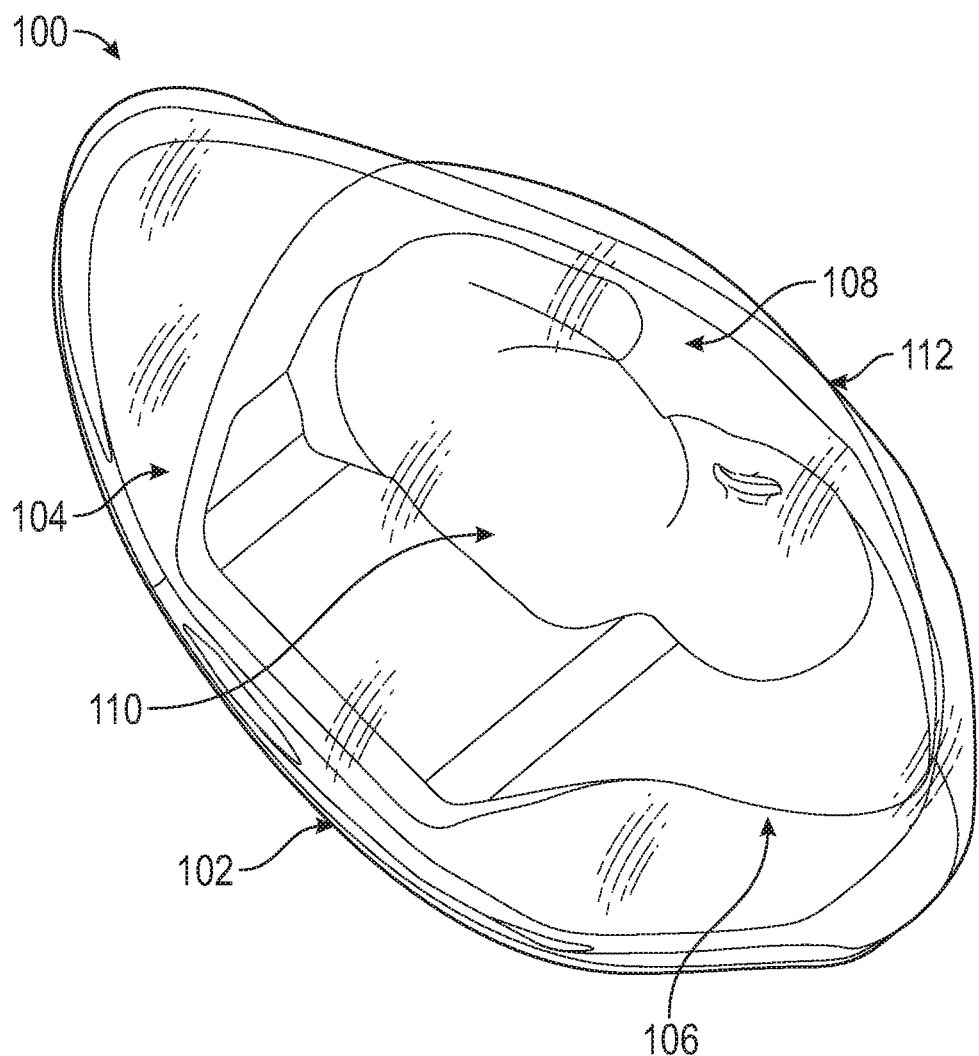
FIG. 1 is a perspective view of a pregnant abdominal system according to an embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. For simplicity, in some instances the same reference numbers are used throughout the drawings to refer to the same or like parts.

One of the aims of healthcare simulation is to establish a teaching environment that closely mimics key clinical cases in a reproducible manner. The introduction of high fidelity tetherless simulators, such as those available from Gaumard Scientific Company, Inc., over the past few years has proven to be a significant advance in creating realistic teaching environments. The present disclosure is directed to a patient simulator system that expands the functionality of the stimulators by providing a pregnant abdominal assembly for use with patient simulators, including birthing simulators such as the NOELLE® line of birthing simulators available from Gaumard Scientific Company, Inc. in Miami, Fla. In that regard, the pregnant abdominal and its component assembly described herein allow an interactive scenario simulating a routine gestation palpation of a fetal baby, the performance of art external cephalic version as well as the Leopold's Maneuvers. Further, the pregnant abdominal system can be used as a platform to either physically hear the fetus heartbeat using stethoscope, Doppler Instrument, or a prenatal monitor as well as ultrasound the fetus within the system's skin directly or through the means of sensor activation and virtual ultrasound clips and/or actual ultrasound of the fetus disposed within the abdominal.

The pregnant abdominal system of the present disclosure offers a realistic interpretation of a fetal baby palpation, ultrasound, prenatal heartbeat monitor and performance of procedures such as external cephalic version as well as Leopold's Maneuvers with the expected dermal layers for added realism. Delivering a pregnant abdominal unit relevant in its anatomical size, geometry and pigmentation, surgical recognition and familiarity can be obtained in order to successfully perform the procedures providing realistic effects. The practitioner can achieve the medical experience of successfully assessing the fetal baby's location and position through Leopold's Maneuvers or performing an external cephalic version as well as attain the skills of physically recognizing the fetus condition and placement that will lead to choosing the optimum pregnancy care and delivery approach in a stress free environment. Anatomical sites such as the pubic bone are found in the system to effectively recognize adequate fetal baby placement for birthing being it vaginal or caesarian section. Moreover, fetal baby and amniotic sac are consistent in size and feel to that of a woman in the last trimester of pregnancy.

Referring now to FIG. 1, shown therein is a perspective view of a pregnant abdominal system 100 according to an embodiment of the present disclosure. As shown, the pregnant abdominal system includes a platform or supporting tray 102, support structures 104, 106, an amniotic sac 108 containing a fetus 110, and an abdominal skin overlay 112. These components are arranged to provide a lifelike simulation of a pregnant abdomen of a female such that the pregnant abdominal system 100 is configured for use in training simulations, including palpation for placement and location of the fetus consistent with a pregnancy in its third trimester, performance of the external cephalic version for vaginal birthing prep, analysis of the fetus using a stethoscope, Doppler ultrasound, a prenatal monitor, and/or ultrasonic imaging.

Figure 2:
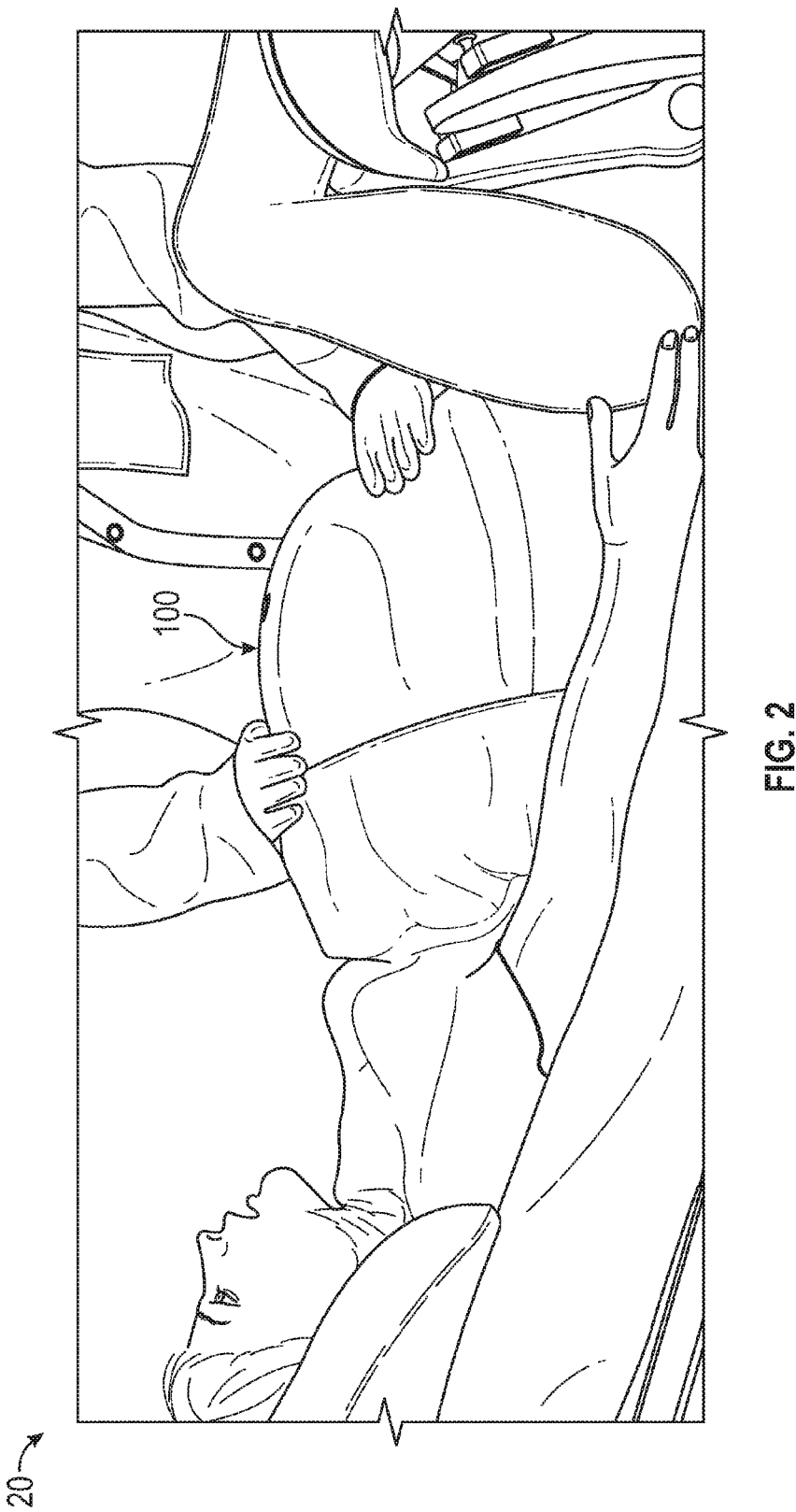
FIG. 2 is a perspective, side view of the pregnant abdominal system of FIG. 1 in use with a patient simulator according to an embodiment of the present disclosure.

As shown in FIG. 2, the pregnant abdominal system 100 is configured to mate with a patient simulator 120. In that regard, the pregnant abdominal system 100 is sized and shaped such that it properly sits and adapts within the lower and upper abdomen opening of the patient simulator 120 to provide an accurate anatomical procedural platform. In that regard, in some implementation the pregnant abdominal system 100 is sized and shaped for use as a tummy cover on a birthing simulator and/or other patient simulator, such as those described in U.S. patent application Ser. No. 13/223,020, U.S. patent application Ser. No. 13/031,116, U.S. patent application Ser. No. 13/031,087, U.S. patent application Ser. No. 13/031,102, U.S. patent application Ser. No. 12/856,903, U.S. patent application Ser. No. 12/708,682, U.S. patent application Ser. No. 12/708,659, U.S. patent application Ser. No. 11/952,606, U.S. patent application Ser. No. 11/952,669, U.S. Pat. No. 8,016,598, U.S. Pat. No. 7,976, 313, U.S. Pat. No. 7,976,312, U.S. Pat. No. 7,866,983, U.S. Pat. No. 7,114,954, U.S. Pat. No. 7,192,284, U.S. Pat. No. 7,811,090, U.S. Pat. No. 6,758,676, U.S. Pat. No. 6,503,087, U.S. Pat. No. 6,527,558, U.S. Pat. No. 6,443,735, U.S. Pat. No. 6,193,519, and U.S. Pat. No. 5,853,292, and U.S. Pat. No. 5,472,345, each herein incorporated by reference in its entirety. In that regard, in some particular implementations the pregnant abdominal system 100 is configured for use on a birthing simulator such that a user can palpate and perform related procedures with the fetus within the pregnant abdominal system 100 and then simulate a complete birth with a separate birthing fetus contained within the birthing simulator.

Figure 3:
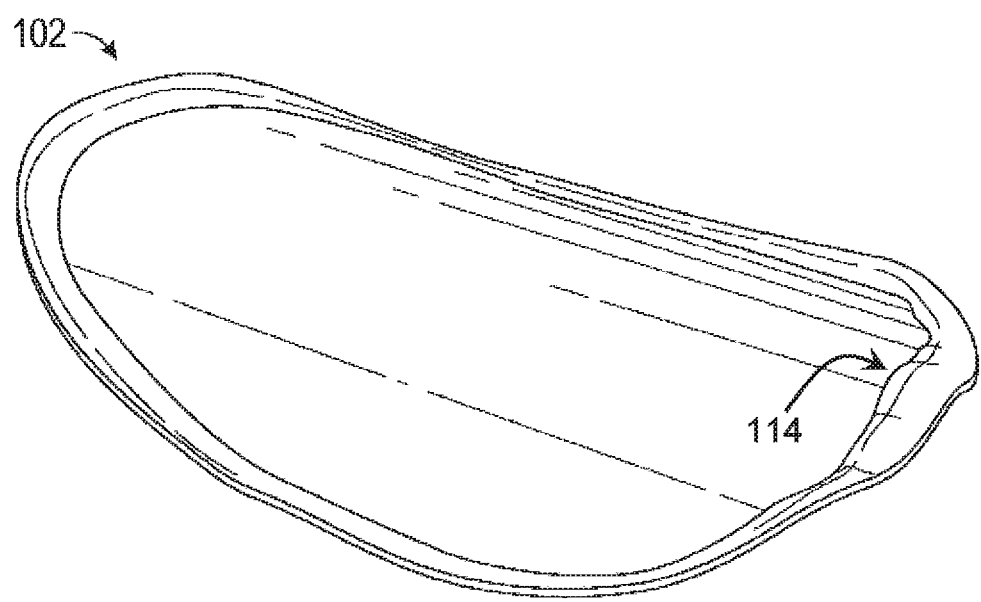
FIG. 3 is a perspective view of a platform of the pregnant abdominal system of FIG. 1 according to an embodiment of the present disclosure.

Referring now to FIG. 3, shown therein is a perspective view of the platform or tray 102 of the pregnant abdominal system 100 according to an embodiment of the present disclosure. The platform 102 is configured to support the pregnant abdominal system 100. Further, the platform 102 is sized and shaped to facilitate mating engagement with the patient simulator's 120 torso opening. In that regard, the platform 102 is designed to conform to the torso of the patient simulator 120 so as to produce at least a complete, full-torso simulator experience. Additionally, the platform 102 features pubic bone structure 114 as a routine anatomical landmark. The material selected for the platform may be any that is rigid in its nature and able to support approximately 50-70 lbf in a dynamic scenario. For the pregnant abdominal system 100, polyethylene terephthalate (PETG) in clear is utilized in some instances because it provides the stipulated support force and a clear window to visualize the fetus position and placement.

Figure 4:
FIG. 4 is a perspective view of a fetus of the pregnant abdominal system of FIG. 1 according to an embodiment of the present disclosure.

Referring now to FIG. 4, shown therein is a perspective view of the fetus 110 of the pregnant abdominal system 100 according to an embodiment of the present disclosure. The fetus 110 is sized and shaped to simulate of a fetus of gestational age between 20 weeks and 40 weeks. The fetus 110 is formed of material(s) that allow realistic palpation of the fetus through the abdominal skin overlay 112 and the amniotic sac 108. In some instances, the fetus 110 has an increased hardness relative to a natural fetus in order to allow its successful palpation. The fetus 110 is produced in vinyl material to achieve this goal, in some implementations. However, the fetus 110 can also be constructed from softer material(s) while localizing hard regions such as the head, the fundus, and/or the spinal cord/back region for added realism. In some embodiments, the fetus 110 is further configured to facilitate realistic ultrasound imaging of the fetus 110. To that end, the fetus 110 includes simulated skeletal structural components, simulated organs, and/or other simulated anatomical features that are detectable and identifiable via ultrasound imaging. In some instances, the fetus 110 is contained within an anatomically correct endoskeleton to simulate an effective ultrasound of the pregnancy. For the ultrasound fetus' construction, different layer of silicon and urethane may be selected to produce the desired imaging effect.

Figure 5:
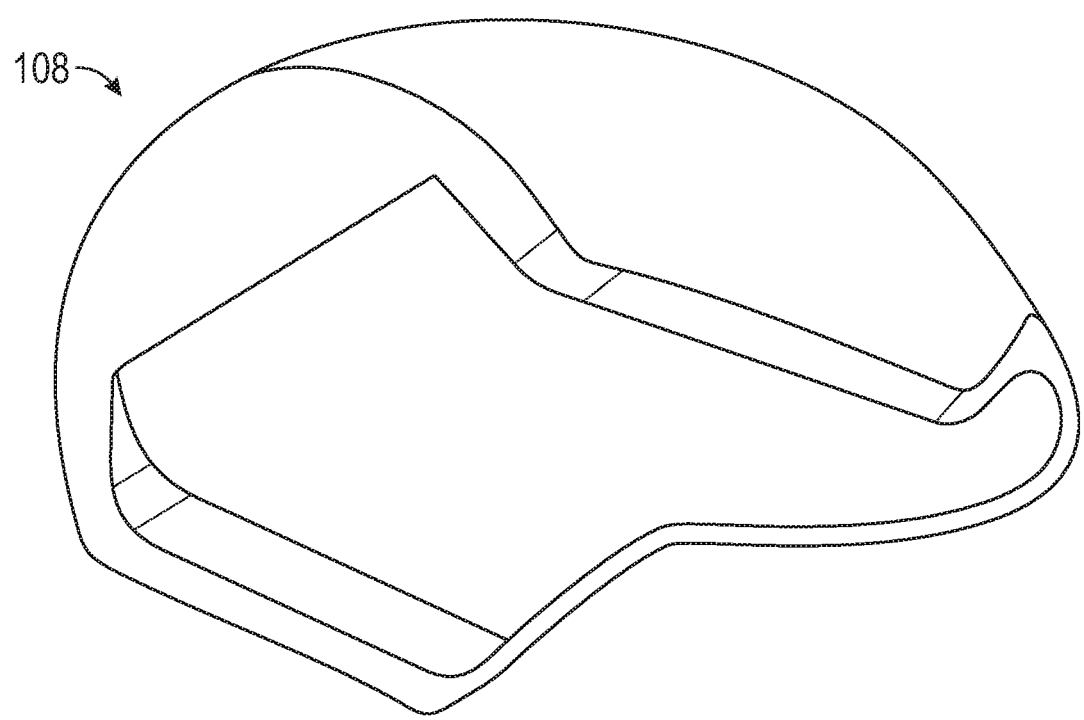
FIG. 5 is a perspective view of an amniotic sac of the pregnant abdominal system of FIG. 1 according to an embodiment of the present disclosure.

Referring now to FIG. 5, shown therein is a perspective view of the amniotic sac 108 of the pregnant abdominal system 100 according to an embodiment of the present disclosure. In that regard, the amniotic sac 108 is configured to contain the fetus 110. The amniotic sac 108 also contains a medium, such as a fluid or gel, that surrounds the fetus 110. The medium found within the amniotic sac 108 renders a life-like lubricious consistency similar to that felt in the typical human pregnant abdomen. In some instances, the selected medium is composed of a chemical composition containing powdered silica. However the medium selection can be arty that portrays similar characteristics to natural amniotic sac fluid, including its appearance and viscosity. The amniotic sac 108 construction is designed with a clear plastic film that will properly simulate the seamless feel of the amniotic sac. In some instances, CRYOVAC® material is utilized for the amniotic sac 108 due to its effectiveness in extending the enclosed shelf life. However, other materials may also be used for the outer layer of the amniotic sac 108.

Figure 6:
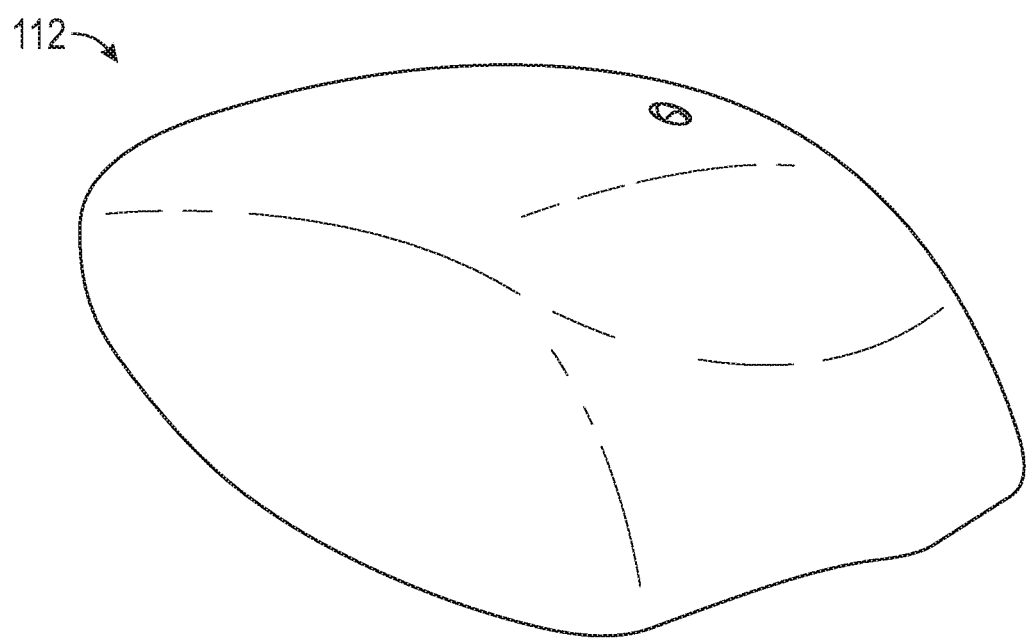
FIG. 6 is a perspective view of a skin layer of the pregnant abdominal system of FIG. 1 according to an embodiment of the present disclosure.

Referring now to FIG. 6, shown therein is a perspective view of the abdominal skin overlay according to an embodiment of the present disclosure. The abdominal skin overlay 112 of the pregnant abdominal system 100 provides a relatively soft feel representative of the common human skin in the range of 10 and 50 in hardness in the scale under the Rockwell hardness standard. In some instances, the abdominal skin overlay 112 is formed using platinum cured silicone as primary material as well as the appropriate lifelike skin pigmentation and geometry composition. For example, in some instances the platinum cured silicone utilized is ECO-FLEX® 0030 Medium, SMOOTH-ON®, Inc., Easton, Pa. Such materials have been found to be the most successful for the use and construction of the outer skin layer material due to its effective endurance and behavior to needle puncture, cutting, and suture retention while maintaining relevant to a high degree of realism.

Figure 7:
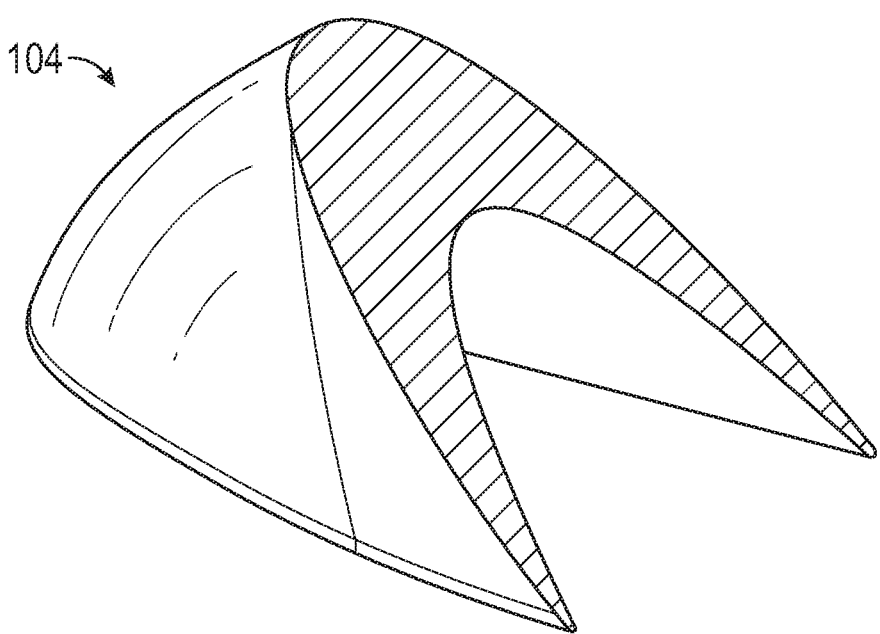
FIG. 7 is a perspective view of a top foam piece of the pregnant abdominal system of FIG. 1 according to an embodiment of the present disclosure.
Figure 8:
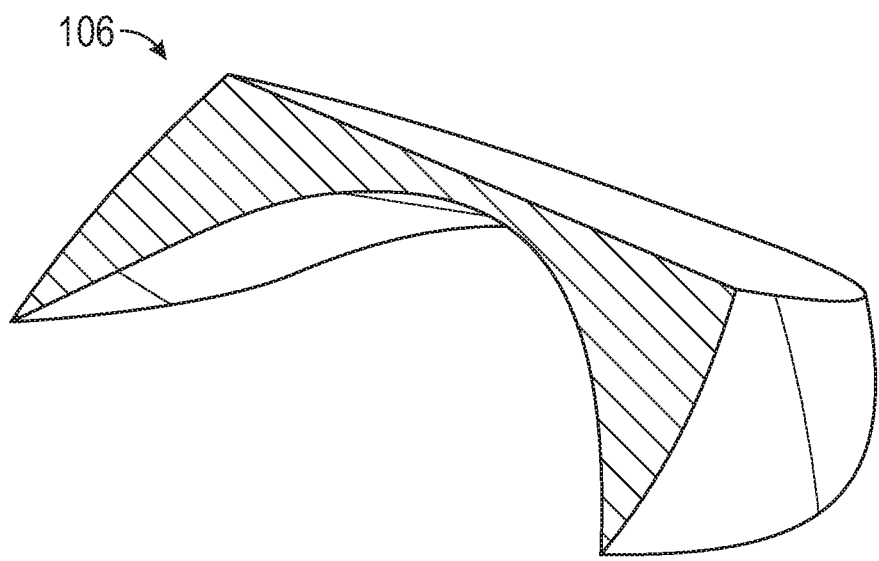
FIG. 8 is a perspective view of a bottom foam piece of the pregnant abdominal system of FIG. 1 according to an embodiment of the present disclosure.

Referring now to FIGS. 7 and 8, shown therein are perspective views of support structures 104, 106 of the pregnant abdominal system 100 according to an embodiment of the present disclosure. The support structures 104, 106 are sized and shaped to be positioned within the pregnant abdominal system 100 between the platform 102 and the abdominal skin overlay 110 to help maintain the desired, realistic position of the amniotic sac 108 and fetus 110, while still allowing some movement. Generally, the support structures 104, 106 may take on any shape or geometry. Further, any number of support structures may be utilized. The two support structures 104, 106 are for example only. In some instances, the support structures 104, 106 are formed of a foam material, such as FOAM IT Ill®, SMOOTH-ON®, Inc., Easton, Pa.

Referring now to FIGS. 9-19, aspects of processes suitable for manufacturing the pregnant abdominal systems of the present disclosure will be described. These are understood to be exemplary in nature and in no way limit the manner in which any of the components of the pregnant abdominal system 100 can be made and/or assembled.

Figure 9:
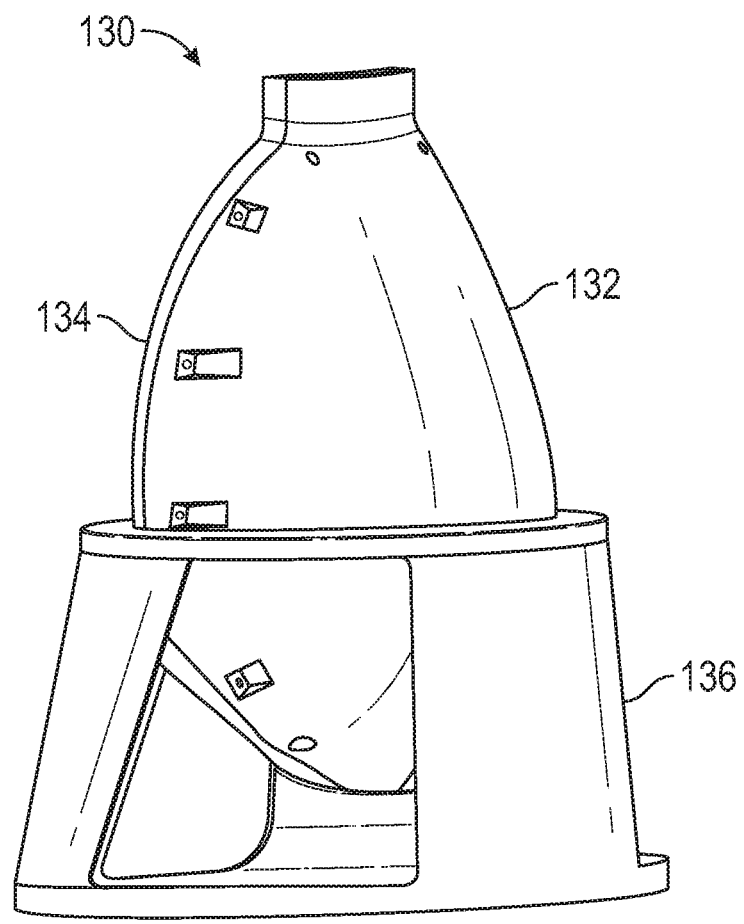
FIG. 9 is a perspective view of a mold assembly for forming the abdominal skin overlay of the pregnant abdominal system according to an embodiment of the present disclosure.
Figure 10:
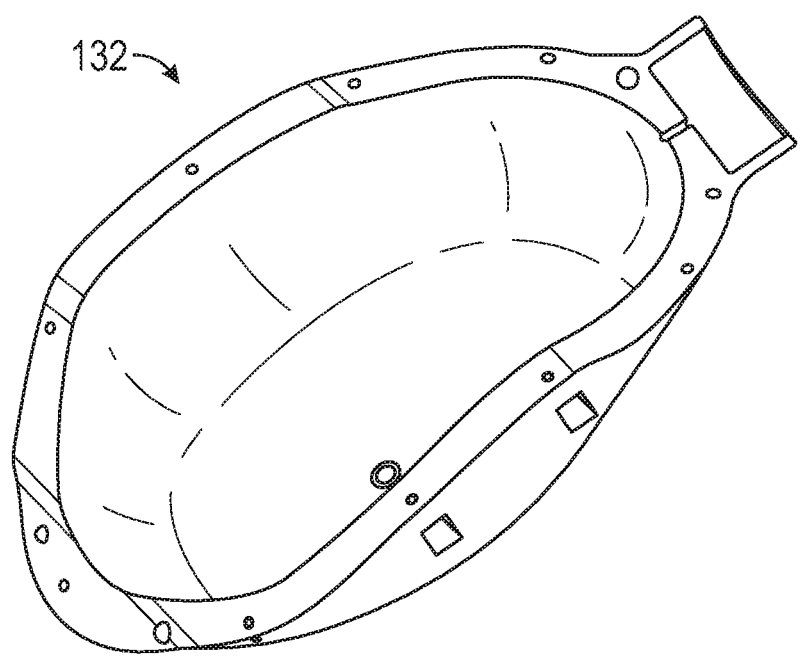
FIG. 10 is a perspective view of a cope of the mold assembly of FIG. 9 according to an embodiment of the present disclosure.
Figure 11:
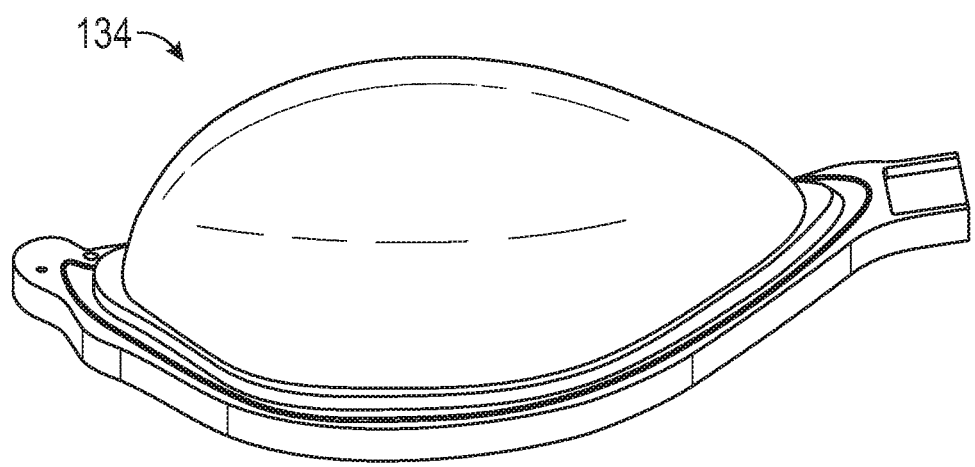
FIG. 11 is a perspective view of a drag of the mold assembly of FIG. 9 according to an embodiment of the present disclosure.
Figure 12:
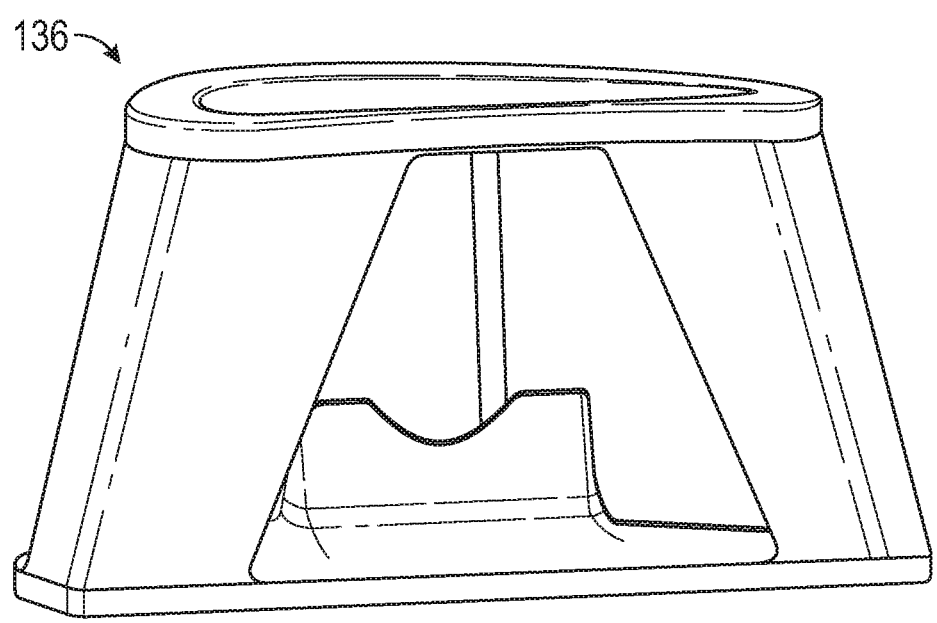
FIG. 12 is a perspective view of a base of the mold assembly of FIG. 9 according to an embodiment of the present disclosure.

Referring to FIGS. 9-12, shown therein are aspects of a mold assembly 130 for forming the abdominal skin overlay 112 of the pregnant abdominal system 110 according to an embodiment of the present disclosure. In that regard, FIG. 9 provides a perspective view of the mold assembly 130 according to an embodiment of the present disclosure; FIG. 10 provides a perspective view of a cope 132 of the mold assembly 130 according to an embodiment of the present disclosure; FIG. 11 provides a perspective view of a drag 134 of the mold assembly 130 according to an embodiment of the present disclosure; and FIG. 12 provides a perspective view of a base 136 of the mold assembly 130 according to an embodiment of the present disclosure.

Using the mold assembly 130, the abdominal skin overlay 112 can be formed. For example, in some implementations the following steps are performed to form the abdominal skin overlay 112 using the mold assembly 130.

1. Set both sides of mold open (cope 132 and drag 134) and generously spray mold release, EASE RELEASE® 200 Ease Release 200, MANN RELEASE TECHNOLOGIES®.
2. Properly allocate square nuts in square openings.
3. Insert screws in from cope 132 to drag 134 direction and tighten.
4. Pour 2000 grams of platinum cured ECOFLEX® 0030 part B into container.
5. Add 0.11% of flesh skin pigmentation and two of old blood pigmentation SLIC-PIG® into container.
6. Pour 2000 grams of platinum cured ECOFLEX® 0030 part A into different container.
7. Vacuum mixture to approximately 25 psi.
8. Allow mixture to sit approximately 5 minutes in order to permit passage of entrapped air.
9. Open valve and remove container from inside vacuum.
10. Transfer mixture independently into cartridges.
11. Inject cartridges into mold at approximately 80 psi.
12. Allow 4-6 hours curing time.
13. Demold.

Figure 13:
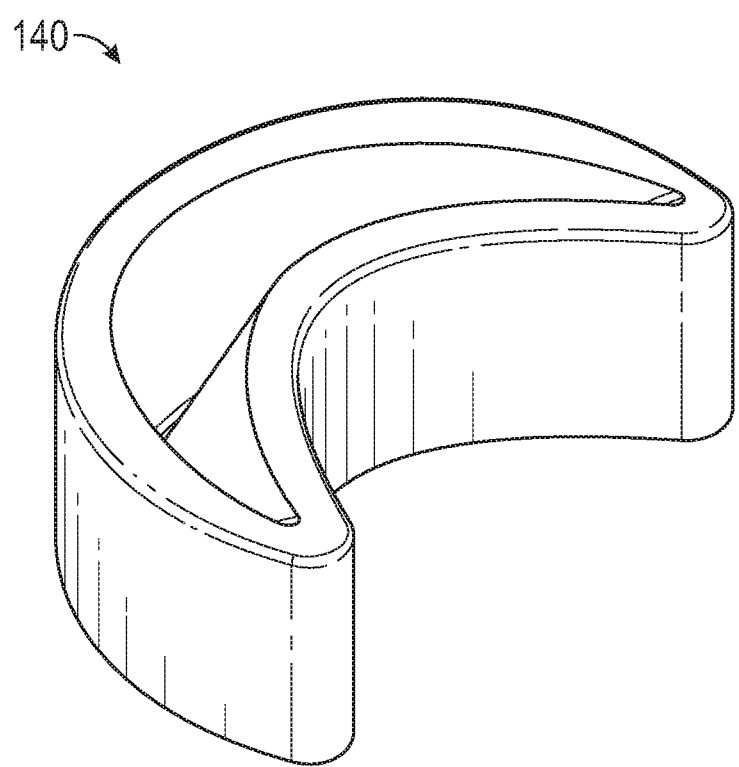
FIG. 13 is a perspective view of mold assembly for forming the top foam piece of the pregnant abdominal system according to an embodiment of the present disclosure.
Figure 14:
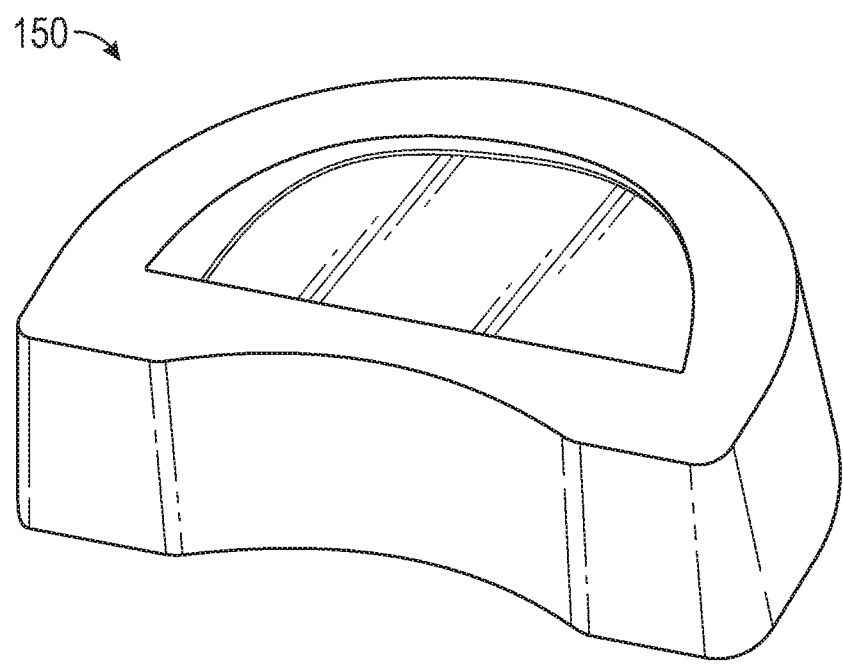
FIG. 14 is a perspective view of mold assembly for forming the bottom foam piece of the pregnant abdominal system according to an embodiment of the present disclosure.

Referring now to FIGS. 13 and 14, shown therein are aspects of mold assemblies for forming the support structures 104, 106 of the pregnant abdominal system 110. In that regard, FIG. 13 provides a perspective view of a mold 140 for forming support structure 104 according to an embodiment of the present disclosure; and FIG. 14 provides a perspective view of a mold 150 for forming support structure 106 according to an embodiment of the present disclosure. Using the molds 140 and 150, the support structures 104, 106 can be formed. For example, in some implementations the following steps are performed to form the support structures 104, 106 using the molds 140 and 150.

1. Set open mold 140 of top foam support structure 104 and open mold 150 of bottom foam support structure 106 on table and generously spray mold release, EASE RELEASE® 200, MANN RELEASE TECHNOLOGIES®.
2. Pour 140 grams of FOAM IT III®, SMOOTH-ON® B into container.
3. Optional step: Add 0.11% of flesh skin pigmentation and two of old blood pigmentation SLIC-PIG® into container.
4. Pour 70 grams of FOAM IT III®, SMOOTH-ON® part A into container.
5. Rigorously hand mix combination for a minute
6. Pour half of mixture into each mold.
7. Allow an hour before trimming overflowing excess material from top using a knife, blade, or saw.
8. Demold.

The platform 102 of the pregnant abdominal system 110 can be made using any suitable process. In some embodiments, the platform 102 is created using a vacuum form process for PETG in clear. In that regard, the vacuum form process creates the platform 102 having the desired shape and structure features.

As discussed above, in some instances the fetus 110 is formed using vinyl to provide for realistic palpation. In some implementations the following steps are performed to form the fetus 110 out of a vinyl material.

1. Pour liquid vinyl into a rotational mold.
2. Insert rotational mold into oven chamber and allow curing.
3. Demold part and allow cooling to set.

As discussed above, in some instances the fetus 110 is formed from materials to facilitate ultrasound imaging of the fetus. In some implementations the following steps are performed to form the fetus 110 suitable for ultrasound imaging.

1. Set both sides of mold open (cope and drag) and generously spray mold release, EASE RELEASE® 200, MANN RELEASE TECHNOLOGIES®.
2. Properly allocate square nuts in square openings.
3. Insert screws in from cope to drag direction and tighten.
4. Produce skeletal parts using urethane.
5. Place internal bone-like parts within mold,
6. Pour platinum cured ECOFLEX® 0030 part B into container.
7. Add 0.11% of flesh skin pigmentation and two of old blood pigmentation SLIC-PIG® into container.
8. Pour platinum cured ECOFLEX® 0030 part A into different container.
9. Vacuum mixture to approximately 25 psi.
10. Allow mixture to sit approximately 5 minutes in order to permit passage of entrapped air.
11. Open valve and remove container from inside vacuum.
12. Transfer mixture independently into cartridges.
13. Inject cartridges into mold at approximately 40 psi.
14. Allow 4-6 hours curing time.
15. Demold.

Figure 15:
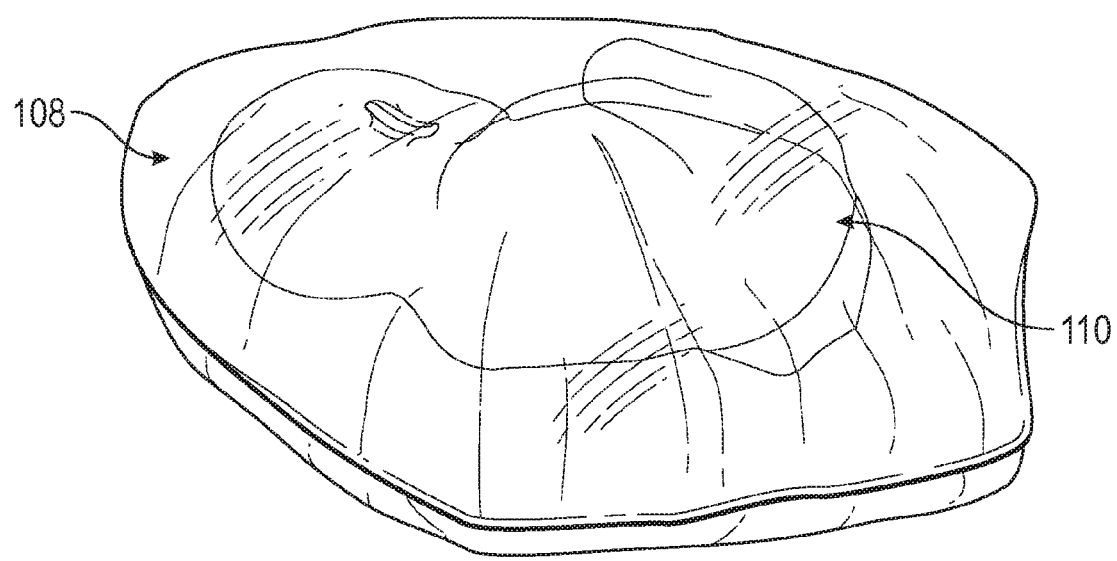
FIG. 15 is a perspective view of the amniotic sac of the pregnant abdominal system with the fetus embedded therein according to an embodiment of the present disclosure.

With the fetus 110 formed, the amniotic sac 108 with the fetus 110 embedded therein can be created. In that regard, FIG. 15 shows a perspective view of the fully assembled amniotic sac 108 with the fetus 110 therein. In some implementations the following steps are performed to form the amniotic; sac 108 of the pregnant abdominal system 100.

1. Create die cut 2D geometry on 4 layers of CRYOVAC® material.
2. Place fetus 110 within the double two layers center.
3. Heat seal perimeter on two double layers, leaving filling port with open access.
4. Inject at low psi gel medium to completely fill formed sac selected optimum weight but not limited to 17.5 lbs.
5. Set system aside overnight to allow entrapped air to escape.
6. Fold filling port inwards and heat seal at its perimeter.

With the various components of the pregnant abdominal system 100 individually formed, including the platform 102, the support structures 104, 106, the amniotic sac 108 with fetus 110, and the abdominal skin overlay 112, the pregnant abdominal system 100 can be fully assembled. In some instances, the following steps are utilized to assemble the pregnant abdominal system 100.

Figure 16:
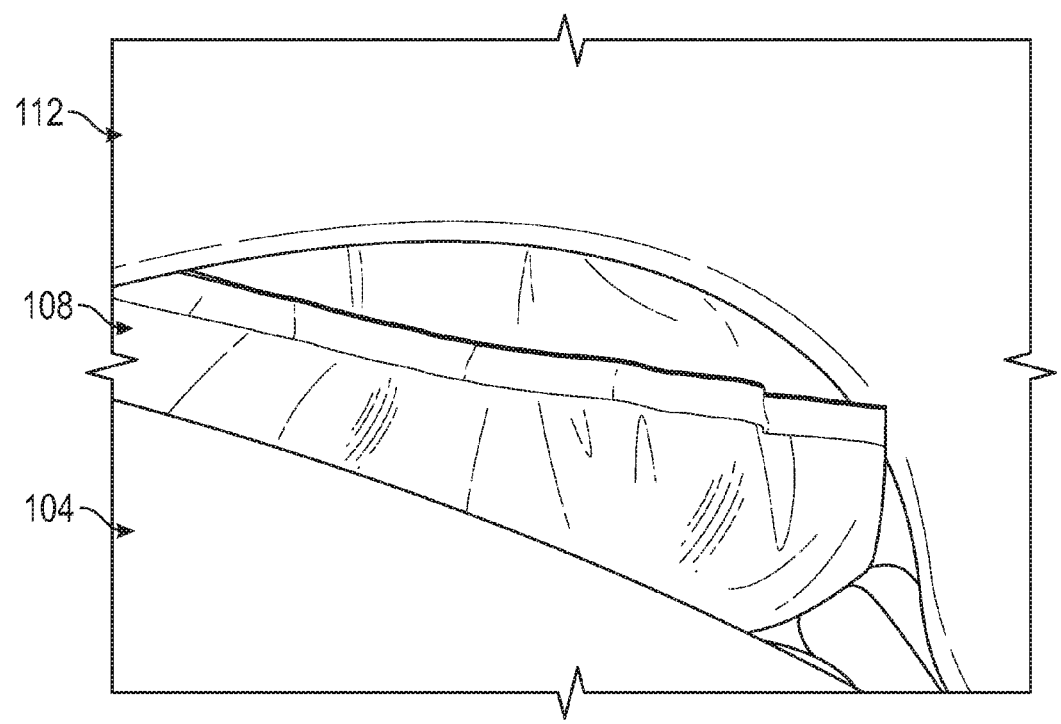
FIG. 16 is a perspective view showing the amniotic sac of FIG. 15 positioned between the skin layer and the top and bottom foam pieces of the pregnant abdominal system according to an embodiment of the present disclosure.

1. Clean platform 102 thoroughly with isopropanol to remove oil and/or dust particles collected and set on a flat surface.
2. Place amniotic sac 108 at center and proximate to the pubic bone 114 of the platform 102.
3. Place 3D top and bottom foam support structures 104, 106 at their designed locations on platform.
4. Dispense two drops of LOCTITE® 401 glue at opposite side on the platform 102 directly under each foam pad (top and bottom support structures 104, 106) in order to properly secure their placement.
5. Center and place abdominal skin overlay 112 over amniotic sac 108 verifying the skin step has a direct match with platform perimeter. FIG. 16 provides a perspective view of this step being performed.
6. Apply primer at adhesion points: skin under step as well as on the platform side edges.
7. Initiate adhesion process from either top or bottom in order to secure adequate pregnant abdominal skin overlay 112 placement.

Figure 17:
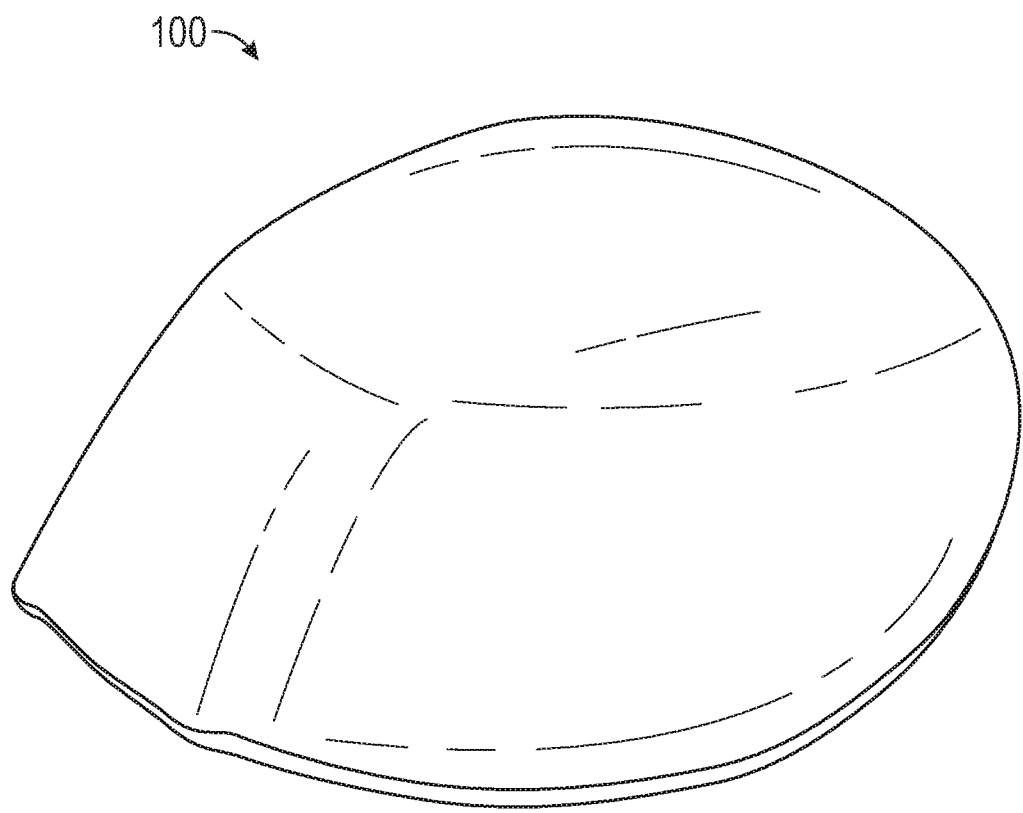
FIG. 17 is a perspective view of a fully assembled pregnant abdominal system according to an embodiment of the present disclosure.

8. Adhere bottom of pregnant abdominal skin overlay 112 step to side and top edges of the platform 102 using LOCTITE® 401 glue. Follow and repeat adhesion process through the platform's 102 perimeter at every inch.
9. Powder complete system to remove tackiness from the pregnant abdominal system's 100 surfaces.
10. The fully assembled pregnant abdominal system 100 is complete. FIG. 17 provides a perspective view of the assembled pregnant abdominal system 100.

Figure 18:
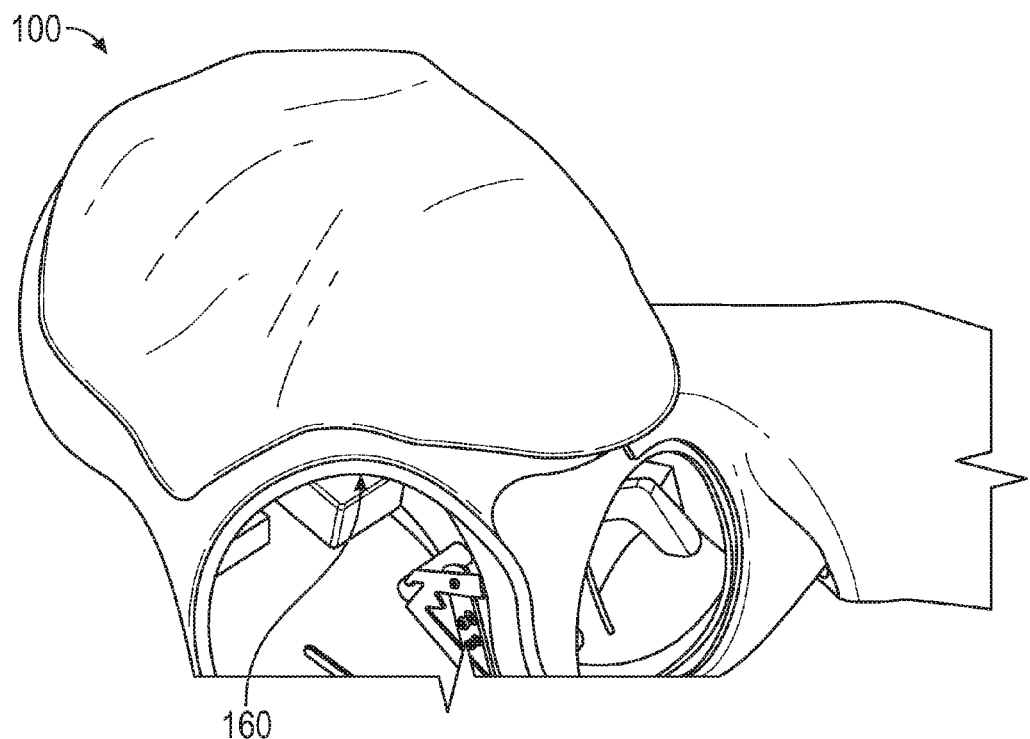
FIG. 18 is a perspective view of the pregnant abdominal system positioned on a portion of a patient simulator according to an embodiment of the present disclosure.
Figure 19:
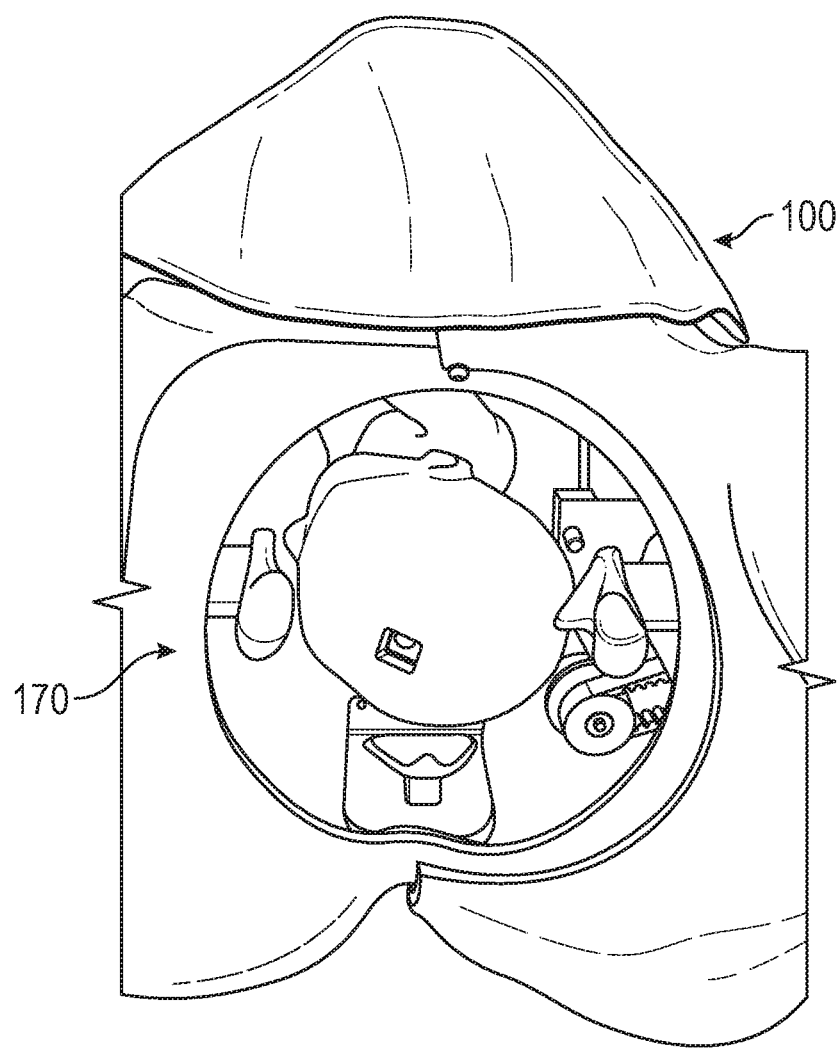
FIG. 19 is a perspective view of the pregnant abdominal system positioned on a portion of a patient simulator having a birthing mechanism according to an embodiment of the present disclosure.

Referring now to FIGS. 18 and 19, with the pregnant abdominal system 100 complete, the pregnant abdominal system 100 can be placed onto a patient simulator to ensure proper fit. In that regard, FIG. 18 provides perspective view of the pregnant abdominal system 100 positioned on a portion of a patient simulator 160 according to an embodiment of the present disclosure. The patient simulator 160 may be the actual patient simulator to which the pregnant abdominal system 100 will be attached for use or it can be a corresponding form or fit test structure to ensure that the pregnant abdominal system 100 will fit properly on another, separate patient simulator for actual use. FIG. 19 similarly provides a perspective view of the pregnant abdominal system 100 positioned on a portion of a patient simulator 170 having a birthing mechanism according to an embodiment of the present disclosure.

The foregoing outlines features of several embodiments so that those skilled in the art may better understand the aspects of the present disclosure. Those skilled in the art should appreciate that they may readily use the present disclosure as a basis for other devices that simulate medical scenarios and situations, including those involving human tissue. Those skilled in the art should also realize that such equivalent constructions do not depart from the spirit and scope of the present disclosure, and that they may make various changes, substitutions, and alterations to the embodiments disclosed herein without departing from the spirit and scope of the present disclosure. Also, it will be fully appreciated that the above-disclosed features and functions, and variations thereof, may be combined into other methods, systems, apparatus, or applications.

What is claimed is:

1. A simulated pregnant abdominal system, comprising:
a platform defining an outer perimeter portion;
one or more support structures coupled to the platform;
a simulated amniotic sac containing a first simulated fetus, the simulated amniotic sac positioned on the one or more support structures; and
a simulated continuous skin layer coupled to the outer perimeter portion of the platform such that the one or more support structures and the simulated amniotic sac are positioned within a space between the simulated continuous skin layer and the platform;
wherein the platform is sized and shaped for mating engagement with a simulated torso of a birthing simulator, such that when matingly engaged, the platform conforms to the simulated torso, the birthing simulator comprising a second simulated fetus.

2. The simulated pregnant abdominal system of claim 1, wherein the one or more support structures are formed of foam.

3. The simulated pregnant abdominal system of claim 1, wherein the simulated amniotic sac is filled with a medium having a viscosity configured to simulate natural amniotic sac fluid.

4. The simulated pregnant abdominal system of claim 1, wherein the first simulated fetus is palpable by a user through the simulated continuous skin layer and within the simulated amniotic sac.

5. The simulated pregnant abdominal system of claim 1, wherein the platform comprises opposing convex and concave side portions about which the outer perimeter portion extends; and wherein the one or more support structures are coupled to the convex side portion of the platform.

6. The simulated pregnant abdominal system of claim 1, wherein the platform comprises a simulated pubic bone structure formed adjacent to the outer perimeter portion so that the simulated amniotic sac is positioned proximate to the simulated pubic bone structure; and wherein the simulated pubic bone structure is visible through the simulated continuous skin layer using ultrasound.

7. The simulated pregnant abdominal system of claim 1, wherein the simulated continuous skin layer is configured to facilitate palpation of the first simulated fetus.

8. The simulated pregnant abdominal system of claim 7, wherein the first simulated fetus is sized and shaped to simulate a third-term fetus.

9. The simulated pregnant abdominal system of claim 1, wherein the first simulated fetus is visible through the simulated continuous skin layer and within the simulated amniotic sac using ultrasound.

10. The simulated pregnant abdominal system of claim 9, wherein the first simulated fetus includes embedded simulated skeletal structures identifiable via ultrasound.

11. A patient simulator, comprising:
a simulated torso sized and shaped to simulate a pregnant woman, the simulated torso including a first simulated fetus; and
a tummy cover sized and shaped for mating engagement with the simulated torso such that when matingly engaged, the tummy cover conforms to the simulated torso, the tummy cover comprising:
a platform defining an outer perimeter portion;
one or more support structures coupled to the platform;
a simulated amniotic sac containing a second simulated fetus, the simulated amniotic sac positioned on the one or more support structures; and
a simulated continuous skin layer coupled to the outer perimeter portion of the platform such that the one or more support structures and the simulated amniotic sac are positioned within a space between the simulated continuous skin layer and the platform.

12. The patient simulator of claim 11, further comprising simulated arms, simulated legs, and a simulated head coupled to the simulated torso.

13. The patient simulator of claim 11, wherein the platform comprises opposing convex and concave side portions about which the outer perimeter portion extends; and wherein the one or more support structures are coupled to the convex side portion of the platform.

14. The patient simulator of claim 11, wherein the platform comprises a simulated pubic bone structure formed adjacent to the outer perimeter portion so that the simulated amniotic sac is positioned proximate to the simulated pubic bone structure; and wherein the simulated pubic bone structure is visible through the simulated continuous skin layer using ultrasound.

15. The patient simulator of claim 11, wherein the second simulated fetus is visible through the simulated continuous skin layer and within the simulated amniotic sac using ultrasound.

16. The patient simulator of claim 15, wherein the second simulated fetus includes embedded simulated skeletal structures identifiable via ultrasound.

17. A method of manufacturing a simulated pregnant abdominal system, the method comprising:
- positioning a simulated amniotic sac containing a first simulated fetus on a platform, the platform defining an outer perimeter portion;
- coupling one or more support structures to the platform adjacent to the simulated amniotic sac; and
- coupling a simulated continuous skin layer to the outer perimeter portion of the platform such that the one or more support structures and the simulated amniotic sac are positioned within a space between the simulated continuous skin layer and the platform;
- wherein the platform is sized and shaped for mating engagement with a simulated torso of a birthing simulator such that when matingly engaged, the platform conforms to the simulated torso, the birthing simulator comprising a second simulated fetus.

18. The method of claim 17, wherein coupling the one or more support structures to the platform includes gluing the one or more support structures to the platform.

19. The method of claim 17, wherein coupling the simulated continuous skin layer to the platform includes gluing the simulated continuous skin layer to the platform.

20. The method of claim 17, further comprising forming the first simulated fetus using a rotational mold.

21. The method of claim 17, further comprising forming the first simulated fetus using an injection mold, wherein the first simulated fetus includes embedded simulated skeletal structures identifiable via ultrasound.

22. The method of claim 17, wherein the platform comprises opposing convex and concave side portions about which the outer perimeter portion extends; and wherein coupling the one or more support structures to the platform comprises coupling the one or more support structures to the convex side portion of the platform.

23. The method of claim 17, wherein the platform comprises a simulated pubic bone structure formed adjacent to the outer perimeter portion so that, when the simulated amniotic sac is positioned on the platform, the simulated amniotic sac is located proximate to the simulated pubic bone structure; and wherein, when the one or more support structures and the simulated amniotic sac are positioned within the space between the simulated continuous skin layer and the platform, the simulated pubic bone structure is visible through the simulated continuous skin layer using ultrasound.

* * * * *